United States Patent [19]
Wong

[11] Patent Number: 6,079,343
[45] Date of Patent: Jun. 27, 2000

[54] PUCKER FREE GARMENT SIDE SEAM AND METHOD FOR PRODUCTION

[75] Inventor: John Wong, Montreal, Canada

[73] Assignee: Taltech Ltd., Virgin Islands (Br.)

[21] Appl. No.: 08/782,002

[22] Filed: Jan. 6, 1997

Related U.S. Application Data

[63] Continuation-in-part of application No. 08/613,656, Mar. 11, 1996, Pat. No. 5,590,615, which is a continuation of application No. 08/245,122, May 17, 1994, Pat. No. 5,568,779.

[51] Int. Cl.[7] .............................. D05B 1/18; A41D 27/10; B32B 7/08; B32B 7/12
[52] U.S. Cl. ..................... 112/475.09; 112/441; 2/275; 2/125; 156/93
[58] Field of Search .......................... 112/441, 475.09, 112/426, 423; 2/275, 247, 115, 122, 248, 125; 156/93

[56] References Cited

U.S. PATENT DOCUMENTS

| | | |
|---|---|---|
| 1,706,461 | 3/1929 | Oathout . |
| 1,784,942 | 12/1930 | Miller . |
| 2,120,458 | 6/1938 | Bodle . |
| 2,240,902 | 5/1941 | Fishman . |
| 2,264,224 | 11/1941 | Swan . |
| 2,266,953 | 12/1941 | Blue . |
| 2,719,803 | 10/1955 | Nottebohm . |
| 2,731,788 | 1/1956 | Donaldson, Jr. . |
| 2,743,450 | 5/1956 | Kling ................................. 112/426 X |
| 2,855,606 | 10/1958 | Berg . |
| 2,925,642 | 2/1960 | Pfeffer, Jr. . |
| 2,937,380 | 5/1960 | Reese . |
| 2,988,457 | 6/1961 | Gatcomb . |
| 3,094,705 | 6/1963 | Reid et al. . |
| 3,333,280 | 8/1967 | Hynek et al. .................. 112/475.09 X |
| 3,399,642 | 9/1968 | Etchison et al. . |
| 3,453,662 | 7/1969 | Weiss . |
| 4,077,066 | 3/1978 | Weiss . |
| 4,549,916 | 10/1985 | Off et al. . |
| 4,555,428 | 11/1985 | Cole .................................... 112/441 X |
| 4,561,128 | 12/1985 | Zimmerman . |
| 4,803,109 | 2/1989 | Saniscalchi . |
| 5,003,902 | 4/1991 | Benstock et al. . |
| 5,063,101 | 11/1991 | Grynaeus et al. . |
| 5,568,779 | 10/1996 | Wong . |
| 5,590,615 | 1/1997 | Wong . |

FOREIGN PATENT DOCUMENTS

| | | |
|---|---|---|
| 0 791 674 A1 | 8/1997 | European Pat. Off. . |
| 1104802 | 12/1958 | Germany . |
| 08209419 | 8/1996 | Japan . |
| 641576 | 8/1950 | United Kingdom . |
| 2 030 844 | 4/1980 | United Kingdom . |

*Primary Examiner*—Ismael Izaguirre
*Attorney, Agent, or Firm*—Kile McIntyre Harbin & Lee; Bradford E. Kile

[57] ABSTRACT

A pucker free garment seam providing a garment with a tailored and wrinkle free appearance. The pucker free seam and method for production utilizes a bonding strip which contains at least a thermal adhesive component which is inserted between first and second garment components sewn together along the seam. A sufficient amount of heat and pressure is applied to the seam which causes the adhesive of the bonding strip to flow onto the surfaces of the garment components and into interstices thereby creating a seam and permanently bonding the first and second garment components together along the seam to eliminate puckering associated with shrinkage of the sewing thread.

66 Claims, 2 Drawing Sheets

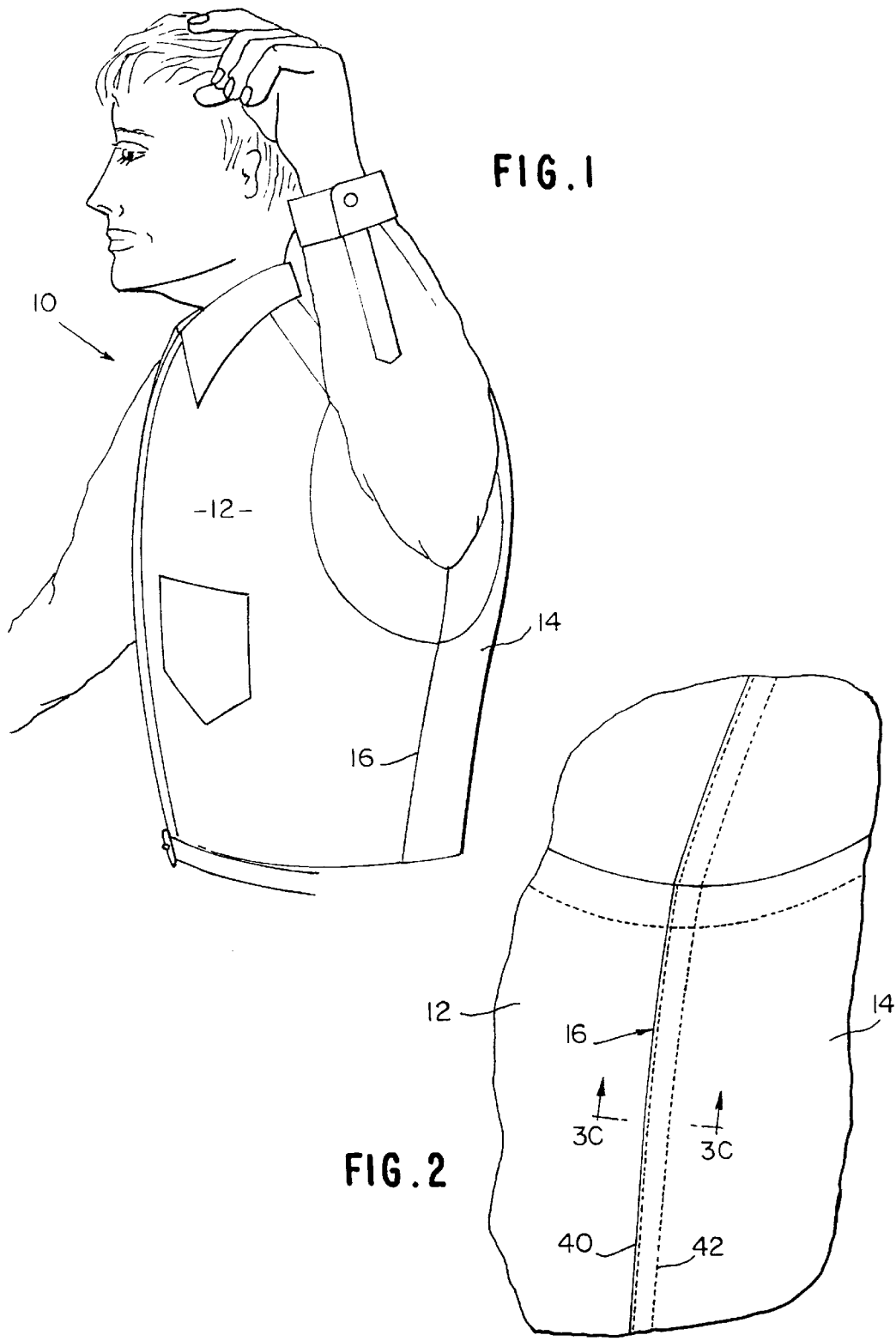

PUCKER FREE GARMENT SIDE SEAM AND METHOD FOR PRODUCTION

RELATED INVENTION

This application is a continuation-in-part of applicant's prior application entitled "Pucker Free Garment Seam and Method of Manufacture" U.S. Ser. No. 08/613,656 filed Mar. 11, 1996, now U.S. Pat. No. 5,590,615 which is a continuation of applicant's prior application entitled "Pucker Free Garment Seam and Method of Manufacture" U.S. Ser. No. 08/245,122, filed May 17, 1994, now U.S. Pat. No. 5,568,779 all of common assignment herewith.

BACKGROUND OF THE INVENTION

The present invention relates to a pucker free garment seam and method for production. More specifically, the invention is directed to an improved garment side seam and method for production which facilely eliminates a tendency of the seam to bunch or pucker at a side seam attachment area of a dress shirt and other similar areas following conventional laundering procedures.

A puckering phenomenon at seam lines has long plagued the garment industry. Seam pucker is typically caused by thread shrinkage which occurs during laundering of a garment. In particular, after a garment is purchased by a garment consumer it is subjected to laundering cycles as the shirt is worn and becomes soiled. During these laundering and drying cycles the sewing thread typically undergoes longitudinal shrinkage. It is this shrinkage, at a rate greater than the surrounding shirt material that creates puckering at a seam joining two panels of fabric. In this, the sewing thread contracts upon being laundered and pulls on opposing garment components at the garment seam which in turn causes the garment components to buckle and thereby create wrinkles a long the garment seam. This effect is noticeable in dress shirt side seams. Accordingly, it would be highly desirable to provide a method for production and a shirt garment which would be free of pucker phenomenon in the side seam region. Moreover, it would be desirable to maintain a side seam of a shirt, or the like, which would be smooth and pucker free even after multiple laundering operations.

Several attempts have been made to reduce seam pucker in dress shirts. One attempt utilizes an interlining having a thermoplastic component in the interlining matrix. During the manufacture process the seam is ironed which reduces the cross-sectional thickness of the seam along the stitch line. The reduced thickness allows for slack in the sewing thread such that during subsequent laundering the sewing thread is permitted to shrink an amount equal to the slack. This technique is not entirely effective in reducing seam pucker. First, the garment components sewn together at the seam are allowed to pull apart between outer stitches of the seam which results in buckling of the garment fabric. Second, the thread which is compressed in the interlining matrix becomes bound within the matrix thus shrinkage of the thread still results in at least a degree of seam pucker. Third, manufacturing an interlining results in an overall increase in garment manufacturing cost. This cost is compounded if the interlining is a composite interlining.

Another prior attempt at reducing seam pucker utilizes special garment material. Specifically, the garment components sewn together at the seam are manufactured from material which stretches during the sewing process and which relaxes after the sewing process is complete. This relaxation provides for slack in the sewing thread. This attempt is also ineffective at reducing seam pucker. First, as before, the garment components sewn together at the seam are allowed to pull apart between outer stitches of the seam which results in buckling of the garment fabric. Second, only garments manufactured from certain stretch materials may be utilized to manufacture the garments. The disadvantages associated with this are clear.

Still other prior art attempts alter the nature of the sewing thread used in the sewing process. For example, one such attempt utilizes a composite sewing thread whereby one component of the thread is water soluble. During the laundering process the water soluble component dissolves thereby creating slack in the sewing thread which compensates for thread shrinkage. First, as before, the garment components sewn together at the seam are allowed to pull apart between outer stitches of the seam which results in buckling of the garment fabric. Second, the high cost of manufacturing a sewing thread altered in this way increases the overall garment cost. Third, thread strength can be compromised by such composite design. Last, commercial sewing machines are not well adapted to utilize altered thread. Other prior art attempts which alter the nature of the sewing thread are not believed to be fully effective for the same noted reasons.

The difficulties and limitations suggested in the preceding are not intended to be exhaustive, but rather are among many which demonstrate that although significant attention has been devoted to reducing pucker in garment seams, puckerless garment seams and method for production appearing in the past will admit to worthwhile improvement.

OBJECTS AND BRIEF SUMMARY OF THE INVENTION

It is therefore a general object of the invention to provide a novel, smooth garment seam at a side seam region of a shirt and method for production which will obviate or minimize difficulties of the type previously described.

It is a specific object of the invention to provide a smooth garment seam and method for production which will eliminate seam pucker at a side seam region of a shirt.

It is another object of the invention to provide a smooth garment seam and method for production which may be used in a variety of garments to provide a pucker free tailored appearance.

It is still another object of the invention to provide a smooth garment seam and method for production for advantageous use in a side seam of a dress shirt.

It is yet another object of the invention to provide a smooth garment side seam and method for production which provides for a cost effective solution to seam pucker and does not involve significant modification of existing production apparatus.

BRIEF SUMMARY OF A PREFERRED EMBODIMENT OF THE INVENTION

A preferred embodiment of the invention which is intended to accomplish the foregoing objects includes a bonding strip which contains at least a thermal adhesive component which is inserted between first and second garment components along a seam line of a garment. The seam is subjected to a sufficient amount of heat and pressure to cause the adhesive of the bonding strip to flow over the surfaces of opposing garment components thereby creating a compressed seam and permanently bonding first and second garment components together along the seam to eliminate puckering associated with sewing thread shrinkage.

DRAWINGS

Other objects and advantages of the present invention will become apparent from the following detailed description of a preferred embodiment thereof taken in conjunction with the accompanying drawings, wherein:

FIG. 1 is a pictorial view showing a human figure wearing a shirt having at least a side seam produced in accordance with the present invention;

FIG. 2 is a segmental view showing a side seam region of the dress shirt depicted in FIG. 1 in which the side seam has been produced in accordance with the present invention.

DETAILED DESCRIPTION

Figure 3A:
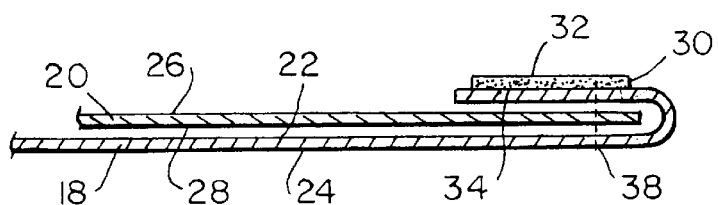
FIGS. 3a through 3c depict cross-sectional views of a method for producing a dress shirt seam in accordance with a preferred embodiment of the present invention.

Referring now to the drawings and particularly to FIG. 1, there is shown a human male figure wearing a dress shirt 10 and having a front panel 12 and a rear panel 14 forming the front and back portions of the shirt 10. A side seam 16 produced in accordance with the present invention joins the front and back panels into a completed shirt garment. The side seam 16 is also continued along the inside of the shirt sleeve as shown in FIG. 2.

Figure 3B:
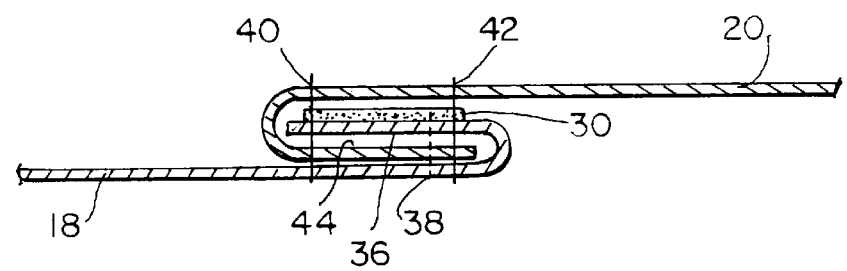
Figure 3C:
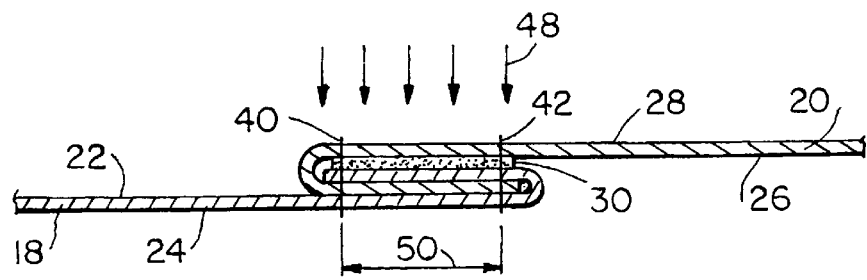

FIGS. 3a through 3c show the progressive production steps for producing and a seam 16 in accordance with a preferred embodiment of the present invention. More specifically, the seam construction is composed of a first garment component 18 and a second garment component 20. In the side seam 16 embodiment of the present invention, the first garment component 18 comprises an edge of the front panel 12 of the dress shirt 10 and the second garment component 20 is the edge of the rear panel 14 of the dress shirt.

As viewed in FIG. 3a, the first garment component 18 has a first or upper surface 22 and a second or lower surface 24. These surfaces correspond to an outer and inner surface respectively of the shirt panel 12. The second garment component 20 also has a first or upper surface 26 and a second or lower surface 28 as viewed in FIG. 3a. These surfaces correspond to an inner and outer surface respectively of the shirt panel 14 as seen in FIG. 3a.

A bonding strip 30 is an integral part of the present invention and has a first or upper surface 32 and a second or lower surface 34 from the perspective of a completed garment seam. In a preferred embodiment of the invention, as shown in the Figures, the bonding strip 30 is composed of an adhesive web consisting entirely of an adhesive material. The adhesive material is preferably composed of a polyamide, polyester, or an olefinic material such as a polyethylene. Other thermoplastic materials such as polyurethane and ethylene vinylacetate copolymer can also be used. The aforementioned adhesives are preferable because they all have a melting point in the range of 60–160 degrees celsius. In the preferred embodiment, the adhesive web is produced from a plurality of filaments having a diameter ranging between 20–80 microns. Furthermore, the adhesive web of the present invention has a density of approximately 10–100 grams per square meter. Alternatively, a more solid structured net adhesive may be used having a density preferably in a range of 8–80 grams per square meter. Other types of adhesives may also be used in accordance with the concept of the present invention provided the adhesive is suitable to bond cloth surfaces of a garment together and will not degrade in water during normal laundering operations.

In order to form a seam 16 in accordance with the invention, as depicted in 3a, an edge portion 36 of the first garment component 18 is reverse folded such that the second surface 24 of the first garment component 18 abuts against the lower second surface 34 of bonding strip 30. An edge 40 of the second garment component 20 is positioned within the reverse fold of the first garment component such that the first surface 22 of the first garment component 18 folds around and abuts the edge of the second garment component 20. A set stitch 38 can be used to attach the components together as depicted in FIG. 3a. In other instances, a set stitch is not utilized and only final top stitches are utilized to bind the components together.

As shown in FIG. 3b, the second garment component 20 is reverse folded over the bonding strip 30 such that the first surface 26 of the second garment component 20 abuts the outer or first surface 32 of the bonding strip 30. In this position, two top stitches 40 and 42 are used to securely and permanently sew the first 18 and second 20 garment components and the bonding strip 30 together. The first stitch 40 preferably extends through the second garment component 20, along and through one edge of the bonding strip 30, an edge of the reverse folded portion of the first garment component 20, and edge 44 of the second garment component 18, and through the first garment component 18. The second stitch 42 preferably extends through the second garment component 20, along and through the other edge of the bonding strip 30, through the folded portion 36 of the first garment component 18, the edge of the portion 44 of the second garment component 20 and the unfolded portion of the first garment component 18.

As shown in FIG. 3c, a production of the improved seam 16 of the present invention is completed with the application of heat and pressure, schematically illustrated by directional arrows 48, to the seam 16. This can be accomplished with an iron pressing process. For improved control and quality this process is usually carried out on a heated press with a temperature of up to 160 degrees celsius for 5 to 10 seconds followed with a vacuum step to cool and set the adhesive. The applied heat and pressure causes the adhesive of the bonding strip 30 to melt and flow onto the surfaces 24, 26 of the first 18 and second 20 garment components. That is, the adhesive flows onto and into the cloth interstices of the reverse folded portion 36 of the first garment component 18 on a second surface 24 thereof and concomitantly onto and into the cloth interstices of the reverse folded first surface 26 of garment component 20 along the first surface 32 of the bonding strip 30. Significantly, during the ironing/pressing process, the flowing adhesive becomes interposed in the interstices of the garment fabric of the first 18 and second 20 garment components. This is advantageous because it creates a very strong bond between the surfaces of the garment components along the seam 16 and around the stitches 40 and 42. It is this bond that prevents seam pucker during subsequent laundering operations. In particular, because the first 18 and second 20 garment components are bonded together along the seam 16, they can not pull apart during laundering and, therefore, buckling of the seam fabric located between the stitches 40, 42 will be prevented. Any tendency of the threads to shrink at a rate different from the fabric is offset and prevented by the bond created by the adhesive strip 30. This is a significant advantage over the prior art seams which permit the fabric comprising the garment components to become separated during subsequent laundering which in turn results in seam pucker. The ironing/pressing process also compresses the seam 16 to reduce the seam thickness, compare FIGS. 3b and 3c.

The distance 50 between stitches 40 and 42, as shown in FIG. 3c, defines the seam width. For maximum prevention of pucker it is important to have the adhesive of the bonding strip 30 flow over the entire surface of the seam width 50. This will ensure complete bonding of the reverse folded portion 36 of the first garment component 18 to the first surface 26 of the second garment component 20 and the threads 40 and 42.

Although in the preferred embodiment the bonding strip 30 consists of an adhesive web as described above, other arrangements are contemplated.

In an alternative embodiment the bonding strip 30 comprises an interlining having an adhesive coating on its outer surfaces. Interlinings are known in the art to provide stiffness to garment components. For example, interlinings are used in shirt collars and center plackets to provide a degree of stiffness. However, the interlining of the present invention utilizes an adhesive on its outer surfaces and is specifically used for garment seams. More specifically, the interlining body of the present invention is preferably a woven interlining made from cotton or a polyester/cotton blend. Alternatively, a nonwoven interlining body made from polyester, nylon, viscose or blends of these materials may also be used. Preferably, the interlining body is fabricated from a single material so as to avoid the high cost associated with producing composite interlinings. The interlinings have a coating of an adhesive on an upper and lower surface. The adhesive is preferably one of the same thermal adhesives previously mentioned in the adhesive web embodiment discussed above. The adhesive may be applied on the upper and lower surfaces of the interlining as an adhesive layer or as a series of adhesive dots. Significantly, a quantity of adhesive sufficient to flow over the garment surfaces, as described above, is most desirable in order to provide complete bonding as contemplated by the present invention. In certain instances, however, where less than complete bonding is adequate the extent of adhesive may be reduced. Although the specific embodiment as shown in the Figures is directed to a side seam 16 of a dress shirt 10, it is to be understood that the seam 16 and method for production of the present invention can advantageously be utilized for a variety of seams, for example in various seams of shirts or other garments such as dress slacks, for example.

In this, the pucker free garment side seam 16 depicted in the Figures is only an exemplary seam and is not intended to limit the scope of the invention.

SUMMARY OF MAJOR ADVANTAGES OF THE INVENTION

After reading and understanding the foregoing detailed description of an inventive garment seam and method for production in accordance with preferred embodiments of the invention, it will be appreciated that several distinct advantages of the subject garment seam and method for production are obtained.

Without attempting to set forth all of the desirable features of the instant garment seam and method for production, at least some of the major advantages include providing a pucker free garment side seam consisting of a first garment component, such as a dress shirt front panel; a second garment component, such as a dress shirt rear panel; and a bonding strip.

The use of the bonding strip in the instant structural arrangement provides for a pucker free garment side seam which has not been successfully accomplished by prior art attempts. Preferably, the bonding strip comprises an adhesive web which flows during pressing and ironing onto and into the interstices of abutting surfaces of the garment components to create a very strong bond between the garment components and joining thread stitching along the garment side seam. This bond prevents the first garment component from separating from the second garment component during subsequent laundering of the garment. Alternatively, the bonding strip consists of an interlining body having a thermal adhesive coating on its outer surface. The interlining body can be fabricated from a single material thus avoiding the use of costly composite interlining body.

The garment side seam and method for production of the present invention provide for a less costly alternative to other prior art attempts at eliminating seam pucker and without the need for substantial modification of current seam production operations.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention.

What is claimed:

1. A method for producing a smooth garment seam between a first garment component and a second garment component, said method comprising the steps:

(a) placing the first garment component having a first and a second surface in an adjacent relationship to a second garment component having a first surface and a second surface so as to define a seam;

(b) reverse folding an edge portion of the first garment component over an edge portion of the second garment component along the seam wherein the first surface of the first garment component overlaps and abuts the first surface of the second garment component;

(c) placing a bonding strip of thermal adhesive having a first surface and a second surface along the seam such that the second surface of the bonding strip abuts the reverse folded edge portion of the second surface of the first garment component;

(d) sewing the first and second garment components and the bonding strip together by a set stitch running along the seam;

(e) reverse folding the second garment component over the bonding strip such that the first surface of the second garment component is folded over and abuts against the first surface of the bonding strip while maintaining the bonding strip in a substantially planar condition;

(f) sewing at least one top stitch through the reverse folded second garment component, the bonding strip, the reverse folded edge portion of the first garment component, an edge portion of the second garment component and the first garment component along the seam; and (g) applying sufficient heat and pressure to said bonding strip to cause the thermal adhesive to melt such that said adhesive flows onto the reverse folded portion of the second surface of the first garment component along the second surface of the bonding strip and concomitantly onto the reverse folded portion of the first surface of the second garment component along the first surface of the bonding strip to provide a bond along the seam and around the top stitch such that the bonded components will effectively reduce a tendency of the seam to exhibit pucker following laundering operations.

2. A method for producing a smooth garment seam between a first garment and a second garment component as defined in claim 1 wherein:

said step of placing a bonding strip of thermal adhesive comprises placing a bonding strip composed of a thermoplastic material.

3. A method for producing a smooth garment seam between a first garment and a second garment component as defined in claim 1 wherein:

said step of placing a bonding strip of thermal adhesive comprises placing a bonding strip composed of a thermoplastic material selected from the group consisting of polyamide, polyester, olefinic, polyurethane, and ethylene vinylacetate copolymer materials.

4. A method for producing a smooth garment seam between a first garment and a second garment component as defined in claim 1 wherein:

said step of placing a bonding strip of thermal adhesive comprises placing a bonding strip of thermal adhesive having a melting point ranging from approximately 60 to 160 degrees Celsius.

5. A method for producing a smooth garment seam between a first garment and a second garment component as defined in claim 1 wherein:

said step of placing a bonding strip of thermal adhesive comprises placing a bonding strip comprised of a thermal adhesive net having a density of approximately 8 to 80 grams per square meter.

6. A method for producing a smooth garment seam between a first garment and a second garment component as defined in claim 1 wherein:

said step of placing the first garment component comprises placing a front panel of a dress shirt in an adjacent relationship to the second garment component comprising a back panel of a dress shirt such that said seam comprises a side seam of a dress shirt.

7. A method for producing a smooth garment seam between a first garment and a second garment component as defined in claim 1 wherein:

said step of placing the first garment component comprises placing said garment component such that said seam comprises a seam of a dress shirt.

8. A method for producing a smooth garment seam between a first garment and a second garment component as defined in claim 1 wherein: the step of applying heat and pressure comprises ironing and pressing.

9. A method for producing a smooth garment seam between a first garment and a second garment component as defined in claim 8 wherein:

the step of ironing and pressing comprises carrying out the process at a temperature of from 60 to 160 degrees Celsius for 5 to 10 seconds.

10. A method for producing a smooth garment seam between a first garment and a second garment component as defined in claim 1 wherein:

said step of placing a bonding strip comprises placing between the reverse folded second surface of the first garment component and the reverse folded first surface of the second garment component a thermal adhesive web composed of a thermal adhesive.

11. A method for producing a smooth garment seam between a first garment and a second garment component as defined in claim 10 wherein:

said step of placing a bonding strip of thermal adhesive comprises placing a bonding strip comprised of a thermal adhesive web composed of a plurality of adhesive filaments having a diameter ranging from approximately between 20 to 80 microns.

12. A method for producing a smooth garment seam between a first garment and a second garment component as defined in claim 10 wherein:

said step of placing a bonding strip of thermal adhesive comprises placing a bonding strip comprised of a thermal adhesive web having a density of approximately 10 to 100 grams per square meter.

13. A method for producing a smooth garment seam between a first garment and a second garment component as defined in claim 1 wherein:

said step of applying heat and pressure comprises applying said heat and pressure for at least 5 seconds.

14. A method for producing a smooth garment seam between a first garment and a second garment component as defined in claim 1 wherein said step of sewing at least one top stitch comprises:

sewing a first top stitch and a substantially parallel second top stitch through the reverse folded over portion of the second garment component, the bonding strip, the reverse folded portion of the first garment component, the unfolded portion of the first garment component, and the unfolded portion of the second garment component.

15. A method for producing a smooth garment seam between a first garment and a second garment component as defined in claim 1 wherein:

said step of placing a bonding strip comprises placing a generally rectangular strip positioned between the reverse folded second surface of the first garment component and the reverse folded first surface of the second garment component without forming a fold in the bonding strip.

16. A method for producing a pucker free, side seam, joining a first garment component forming a front panel of a shirt and a second garment component forming a back panel of a shirt, said method comprising the steps of:

(a) providing a first garment component forming a front panel of the shirt and having a first and second surface;

(b) providing a second garment component, forming a back panel of the shirt and having a first and a second surface, in a juxtaposed relationship with respect to the first garment component to be joined at a side seam of a shirt to the first garment component;

(c) providing a bonding strip of thermal adhesive having a first and a second surface;

(d) reverse folding an edge of the first garment component such that a portion of the first surface of the first garment component abuts the first surface of the second garment component;

(e) placing the bonding strip along the side seam such that the second surface of the bonding strip contacts the second surface of the reverse folded portion of the first garment component;

(f) sewing the first and second garment components and the bonding strip together by a set stitch running along the side seam;

(g) reverse folding the second garment component over the bonding strip such that the first surface of the second garment component is folded over and abuts against the first surface of the bonding strip while maintaining the bonding strip in a substantially planar condition along the side seam;

(h) sewing at least one top stitch through the reverse folded second garment component, the bonding strip, the reverse folded edge portion of the first garment component, an edge portion of the second garment component and the first garment component along the side seam; and (i) applying sufficient heat and pressure to the bonding strip to cause the thermal adhesive to melt such that the adhesive flows onto the reverse folded second surface of the first garment component along the second surface of the bonding strip and concomitantly onto the first surface of the second garment component along the first surface of the bonding strip and said at least one top stitch to provide a bond along the side seam and around said at least one top stitch such that bonded components will effectively reduce a tendency of the seam to exhibit pucker following laundering operations.

17. A method for producing a pucker free, side seam, joining a first garment component forming a front panel of a shirt and a second garment component forming a back panel of a shirt, as defined in claim 16 wherein said step of sewing at least one top stitch comprises:

sewing a first and a second parallel stitch such that the stitches transverse through at least the reverse folded portion of the first garment component, the bonding strip, the reverse folded portion of the second garment component, the second garment component, and the first garment component.

18. A method for producing a pucker free, side seam, joining a first garment component forming a front panel of a shirt and a second garment component forming a back panel of a shirt as defined in claim 16 wherein:

said step of placing a bonding strip of thermal adhesive comprises placing a bonding strip composed of a thermoplastic material.

19. A method for producing a pucker free, side seam, joining a first garment component forming a front panel of a shirt and a second garment component forming a back panel of a shirt as defined in claim 16 wherein:

said step of placing a bonding strip of thermal adhesive comprises placing a bonding strip of thermal adhesive having a melting point ranging from approximately 60 to 160 degrees Celsius.

20. A method for producing a pucker free, side seam, joining a first garment component forming a front panel of a shirt and a second garment component forming a back panel of a shirt as defined in claim 16 wherein:

said step of placing the bonding strip of thermal adhesive comprises placing a bonding strip comprised of a thermal adhesive net having a density of approximately 8 to 80 grams per square meter.

21. A method for producing a pucker free, side seam, joining a first garment component forming a front panel of a shirt and a second garment component forming a back panel of a shirt as defined in claim 17 wherein:

the step of applying heat and pressure comprises the step of ironing and pressing at a temperature between 60 to 160 degrees Celsius for 5 to 10 seconds.

22. A method for producing a pucker free, side seam, joining a first garment component forming a front panel of a shirt and a second garment component forming a back panel of a shirt as defined in claim 16 wherein:

said step of placing a bonding strip comprises placing between the reverse folded second surface of the first garment component and the reverse folded first surface of the second garment component a thermal adhesive web or net composed entirely of a thermal adhesive.

23. A method for producing a pucker free, side seam, joining a first garment component forming a front panel of a shirt and a second garment component forming a back panel of a shirt as defined in claim 16 wherein:

said step of placing a bonding strip of thermal adhesive comprises placing a bonding strip comprised of a thermal adhesive web composed of a plurality of adhesive filaments having a diameter ranging approximately between 20 to 80 microns.

24. In a clothing garment having a first garment component and a second garment component, a smooth seam connecting the two garment components comprising:

a first garment component having a first surface and a second surface;

a second garment component having a first surface and a second surface;

a bonding strip of thermal adhesive having a first and a second surface;

the first garment component being reverse folded along an edge such that a portion of the first surface of the first garment component abuts an edge of the first surface of the second garment component;

the bonding strip extending such that the second surface of the bonding strip abuts the second surface of the reverse folded portion of the first garment component;

a set stitch running along the seam sewing the first and second garment components and the bonding strip together;

the second garment component being reverse folded around the bonding strip such that a portion of the first surface of the second garment component is bonded to the first surface of the bonding strip in the unfolded portion of said first surface of the first garment component abuts the second surface of the reverse folded portion of the second garment component; and at least one top stitch sewn through the reverse folded second garment component, the bonding strip, the reverse folded edge portion of the first garment component, an edge portion of the second garment component and the first garment component along the seam and wherein bonding the seam comprises subjecting the seam to a sufficient amount of heat and pressure to cause the thermal adhesive to bond the reverse folded portion of the second garment component along the first surface thereof and concomitantly to bond the first surface of the second garment component and at least a portion of said at least one top stitch such that a bond is formed by the bonding strip along the seam and around the at least one top stitch to reduce the tendency of the seam to pucker following laundering operations.

25. In a clothing garment having a first garment component and a second garment component, a smooth seam as defined in claim 24 wherein:

said bonding strip of thermal adhesive is composed of a thermoplastic material.

26. In a clothing garment having a first garment component and a second garment component, a smooth seam as defined in claim 24 wherein:

said bonding strip of thermal adhesive is composed of a thermoplastic material selected from the group consisting of polyamide, polyester, olefinic, polyurethane, and ethylene file vinylacetate copolymer materials.

27. In a clothing garment having a first garment component and a second garment component, a smooth seam as defined in claim 24 wherein:

said bonding strip of thermal adhesive has a melting point ranging from approximately 60 to 160 degrees Celsius.

28. In a clothing garment having a first garment component and a second garment component, a smooth seam as defined in claim 24 wherein:

said bonding strip of thermal adhesive is comprised of a thermal adhesive net having a density of approximately 8 to 80 grams per square meter.

29. In a clothing garment having a first garment component and a second garment component, a smooth seam as defined in claim 24 wherein:

said first garment component comprises a front panel of dress shirt;

said second garment component comprises a back panel of a dress shirt; and said seam comprises a side seam of the dress shirt.

30. In a clothing garment having a first garment component and a second garment component, a smooth seam as defined in claim 24 wherein:

said heat and pressure are provided by an ironing and pressing process carried out at a temperature of between 60 and 160 degrees Celsius for 5 to 10 seconds.

31. In a clothing garment having a first garment component and a second garment component, a smooth seam as defined in claim 24 wherein:

said bonding strip is a thermal adhesive web composed entirely of a thermal adhesive.

32. In a clothing garment having a first garment component and a second garment component, a smooth seam as defined in claim 31 wherein:

said thermal adhesive web is composed of a plurality of adhesive filaments having a diameter ranging approximately between 20 to 80 microns.

33. In a clothing garment having a first garment component and a second garment component, a smooth seam as defined in claim 31 wherein:

said thermal adhesive web has a density of approximately 10 to 100 grams per square meter.

34. In a clothing garment having a first garment component and a second garment component, a smooth seam as defined in claim 24 wherein:

said bonding strip is a generally rectangular strip positioned between the reverse folded second surface of the first garment component and the reverse folded first surface of the second garment component without forming a fold in the rectangular bonding strip.

35. In a shirt having a first component, forming a front panel of the shirt, and a second component, forming a back panel of the shirt, joined together with a pucker free, side seam, said pucker free, side seam comprising:

a first garment component forming a front panel of a shirt and having a first and second surface;

a second garment component forming a back panel of the shirt and having a first and second surface;

a bonding strip of thermal adhesive having a first surface and a second surface;

the first garment component being reverse folded along an edge such that a portion of the first surface of first garment component abuts at least a portion of the first surface of the second garment component along the side seam;

the bonding strip extending such that the second surface of the bonding strip abuts the second surface of the reverse folded portion of the first garment component;

a set stitch running along the side seam sewing the first and second garment components and the bonding strip together;

the second garment component being reverse folded over the bonding strip such that a portion of the first surface of the second garment component is bonded to the first surface of the bonding strip and the unfolded portion of the first surface of the first garment component abuts the second surface of the reverse folded portion of the second garment component; and at least one top stitch sewn through the reverse folded second garment component, the bonding strip, the reverse folded edge portion of the first garment component, an edge portion of the second garment component and the first garment component along the side seam and wherein bonding the side seam comprises subjecting the side seam to a sufficient amount of heat and pressure to cause the bonding strip to bond at its second surface to the second surface of the reverse folded portion of the first garment component and concomitantly at the first surface of the bonding strip to the first surface of the reverse folded portion of the second garment component and to at least a portion of said at least one top stitch to provide a bond along the side seam and around at least a portion of the at least one top stitch such that the bonded components will effectively reduce a tendency of the side seam to exhibit pucker following laundering operations.

36. In a shirt having a first component, forming a front panel of the shirt, and a second component, forming a back panel of the shirt, joined together with a pucker free, side seam as defined in claim 35 wherein:

said bonding strip of thermal adhesive is composed of a thermoplastic material.

37. In a shirt having a first component, forming a front panel of the shirt, and a second component, forming a back panel of the shirt, joined together with a pucker free, side seam as defined in claim 35 wherein:

said bonding strip of thermal adhesive has a melting point ranging from approximately 60 to 160 degrees Celsius.

38. In a shirt having a first component, forming a front panel of the shirt, and a second component, forming a back panel of the shirt, joined together with a pucker free, side seam as defined in claim 35 wherein:

said bonding strip of thermal adhesive is a thermal adhesive net having a density of approximately 8 to 80 grams per square meter.

39. In a shirt having a first component, forming a front panel of the shirt, and a second component, forming a back panel of the shirt, joined together with a pucker free, side seam as defined in claim 35 wherein:

the heat and pressure process is carried out by ironing and pressing at a temperature of between 60 to 160 degrees Celsius for 5 to 10 seconds.

40. In a shirt having a first component, forming a front panel of the shirt, and a second component, forming a back panel of the shirt, joined together with a pucker free, side seam as defined in claim 35 wherein:

said bonding strip is a thermal adhesive web composed entirely of a thermal adhesive.

41. In a shirt having a first component, forming a front panel of the shirt, and a second component, forming a back panel of the shirt, joined together with a pucker free, side seam as defined in claim 40 wherein:

said thermal adhesive web is composed of a plurality of adhesive filaments having a diameter ranging approximately between 20 to 80 microns.

42. A method for producing a smooth garment seam between a first garment component and a second garment component, said method comprising the steps:
  (a) placing the first garment component having a first and a second surface in an adjacent relationship to the second garment component having a first surface and a second surface so as to define a seam;
  (b) reverse folding an edge portion of the first garment component over an edge portion of the second garment component along the seam wherein the first surface of the first garment component overlaps and abuts the first surface of the second garment component;
  (c) placing a bonding strip of thermal adhesive having a first surface and a second surface in a substantially planar condition along the seam such that the second surface of the bonding strip abuts the reverse folded edge portion of the second surface of the first garment component;
  (d) reverse folding the second garment component over the bonding strip such that the first surface of the second garment component is folded over and abuts against the first surface of the bonding strip;
  (e) sewing the first and second garment components and the bonding strip together by a first and a second top stitch extending in a substantially parallel path along the edge of the seam and each of said first and said second top stitches extending through said reverse folded second garment component, the substantially planar bonding strip, the reverse folded edge portion of the first garment component, an edge portion of the second garment component and the first garment component along the seam; and
  (f) applying sufficient heat and pressure to said bonding strip to cause the thermal adhesive to melt such that said adhesive flows onto the reverse folded portion of the second surface of the first garment component along the second surface of the bonding strip and concomitantly onto the reverse folded portion of the first surface of the second garment component along the first surface of the bonding strip to provide a bond along the seam and around the first and second top stitches such that the bonded components will effectively reduce a tendency of the seam to exhibit pucker following laundering operations.

43. A method for producing a smooth garment seam between a first garment and a second garment component as defined in claim 42 wherein:
  said step of placing a bonding strip of thermal adhesive comprises placing a bonding strip composed of a thermoplastic material.

44. A method for producing a smooth garment seam between a first garment and a second garment component as defined in claim 43 wherein:
  said step of placing a bonding strip of thermal adhesive comprises placing a bonding strip composed of a thermoplastic material selected from the group consisting of polyamide, polyester, olefinic, polyurethane, and ethylene vinylacetate copolymer materials.

45. A method for producing a smooth garment seam between a first garment and a second garment component as defined in claim 42 wherein:
  said step of placing a bonding strip of thermal adhesive comprises placing a bonding strip of thermal adhesive having a melting point ranging from approximately 60 to 160 degrees Celsius.

46. A method for producing a smooth garment seam between a first garment and a second garment component as defined in claim 42 wherein:
  said step of placing a bonding strip of thermal adhesive comprises placing a bonding strip comprised of a thermal adhesive net having a density of approximately 8 to 80 grams per square meter.

47. A method for producing a smooth garment seam between a first garment and a second garment component as defined in claim 42 wherein:
  said step of placing the first garment component comprises placing a front panel of a dress shirt in an adjacent relationship to the second garment component comprising a back panel of a dress shirt such that said seam comprises a side seam of a dress shirt.

48. A method for producing a smooth garment seam between a first garment and a second garment component as defined in claim 42 wherein:
  said step of placing the first garment component comprises placing said garment component such that said seam comprises a seam of a dress shirt.

49. A method for producing a smooth garment seam between a first garment and a second garment component as defined in claim 42 wherein:
  the step of applying heat and pressure comprises ironing and pressing.

50. A method for producing a smooth garment seam between a first garment and a second garment component as defined in claim 49 wherein:
  the step of ironing and pressing comprises carrying out the process at a temperature of from 60 to 160 degrees Celsius for 5 to 10 seconds.

51. A method for producing a smooth garment seam between a first garment and a second garment component as defined in claim 42 wherein:
  said step of placing a bonding strip comprises placing between the reverse folded second surface of the first garment component and the reverse folded first surface of the second garment component a thermal adhesive web composed of a thermal adhesive.

52. A method for producing a smooth garment seam between a first garment and a second garment component as defined in claim 51 wherein:
  said step of placing a bonding strip of thermal adhesive comprises placing a bonding strip comprised of a thermal adhesive web composed of a plurality of adhesive filaments having a diameter ranging from approximately between 20 to 80 microns.

53. A method for producing a smooth garment seam between a first garment and a second garment component as defined in claim 51 wherein:
  said step of placing a bonding strip of thermal adhesive comprises placing a bonding strip comprised of a thermal adhesive web having a density of approximately 10 to 100 grams per square meter.

54. A method for producing a smooth garment seam between a first garment and a second garment component as defined in claim 42 wherein:
  said step of applying heat and pressure comprises applying said heat and pressure for at least 5 seconds.

55. A method for producing a smooth garment seam between a first garment and a second garment component as defined in claim 42 wherein:
  said step of placing a bonding strip comprises placing a generally rectangular strip positioned between the reverse folded second surface of the first garment component and the reverse folded first surface of the second garment component without forming a fold in the bonding strip.

56. In a clothing garment having a first garment component and a second garment component, a smooth seam connecting the two garment components comprising:

a first garment component having a first surface and a second surface;

a second garment component having a first surface and a second surface;

a bonding strip of thermal adhesive having a first and a second surface in a substantially planar condition;

the first garment component being reverse folded along an edge such that a portion of the first surface of the first garment component abuts an edge of the first surface of the second garment component;

the bonding strip extending such that the second surface of the bonding strip abuts the second surface of the reverse folded portion of the first garment component;

the second garment component being reverse folded around the bonding strip such that a portion of the first surface of the second garment component is bonded to the first surface of the bonding strip in the unfolded portion of said first surface of the first garment component abuts the second surface of the reverse folded portion of the second garment component; and a first and second top stitch sewing the first and second garment components and the bonding strip together and extending in a substantially parallel path along the edge of the seam and each of said first and second top stitches extending through said reverse folded second garment component, the substantially planar bonding strip, the reverse folded edge portion of the first garment component, an edge portion of the second garment component and the first garment component along the seam and wherein bonding the seam comprises subjecting the seam to a sufficient amount of heat and pressure to cause the thermal adhesive to bond the reverse folded portion of the second garment component along the first surface thereof and concomitantly to bond the first surface of the second garment component such that a bond is formed by the bonding strip along the seam and around the first and second top stitches to reduce the tendency to pucker following laundering operations.

57. In a clothing garment having a first garment component and a second garment component, a smooth seam as defined in claim 56 wherein:

said bonding strip of thermal adhesive is composed of a thermoplastic material.

58. In a clothing garment having a first garment component and a second garment component, a smooth seam as defined in claim 56 wherein:

said bonding strip of thermal adhesive is composed of a thermoplastic material selected from the group consisting of polyamide, polyester, olefinic, polyurethane, and ethylene file vinylacetate copolymer materials.

59. In a clothing garment having a first garment component and a second garment component, a smooth seam as defined in claim 56 wherein:

said bonding strip of thermal adhesive has a melting point ranging from approximately 60 to 160 degrees Celsius.

60. In a clothing garment having a first garment component and a second garment component, a smooth seam as defined in claim 56 wherein:

said bonding strip of thermal adhesive is a thermal adhesive net having a density of approximately 8 to 80 grams per square meter.

61. In a clothing garment having a first garment component and a second garment component, a smooth seam as defined in claim 56 wherein:

said first garment component comprises a front panel of dress shirt;

said second garment component comprises a back panel of a dress shirt; and said smooth seam comprises a side seam of a dress shirt.

62. In a clothing garment having a first garment component and a second garment component, a smooth seam as defined in claim 56 wherein:

said heat and pressure are provided by an ironing and pressing process carried out at a temperature of between 60 and 160 degrees Celsius for 5 to 10 seconds.

63. In a clothing garment having a first garment component and a second garment component, a smooth seam as defined in claim 56 wherein:

said bonding strip of thermal adhesive is comprised of a thermal adhesive web composed entirely of a thermal adhesive.

64. In a clothing garment having a first garment component and a second garment component, a smooth seam as defined in claim 63 wherein:

said thermal adhesive web is composed of a plurality of adhesive filaments having a diameter ranging approximately between 20 to 80 microns.

65. In a clothing garment having a first garment component and a second garment component, a smooth seam as defined in claim 63 wherein:

said thermal adhesive web has a density of approximately 10 to 100 grams per square meter.

66. In a clothing garment having a first garment component and a second garment component, a smooth seam as defined in claim 56 wherein:

said bonding strip is a generally rectangular strip positioned between the reverse folded second surface of the first garment component and the reverse folded first surface of the second garment component without forming a fold in the generally rectangular bonding strip.

* * * * *

Disclaimer

6,079,343 — John Wong, Montreal, Canada. PUCKER FREE GARMENT SIDE SEAM AND METHOD FOR PRODUCTION. Patent dated Jun. 27, 2000. Disclaimer filed Feb. 21, 2006 by the Assignee, Taltech, Limited.

The term of this patent, subsequent to 5,568,779, 5,590,615, 5,713,292, 5,775,394, 5,782,191, 5,950,554, and 6,070,542 has been disclaimed.

*(Official Gazette May 23, 2006)*